D. C. LOCKWOOD.
Lathe for Turning Wooden Rings.
No. 214,672. Patented April 22, 1879.
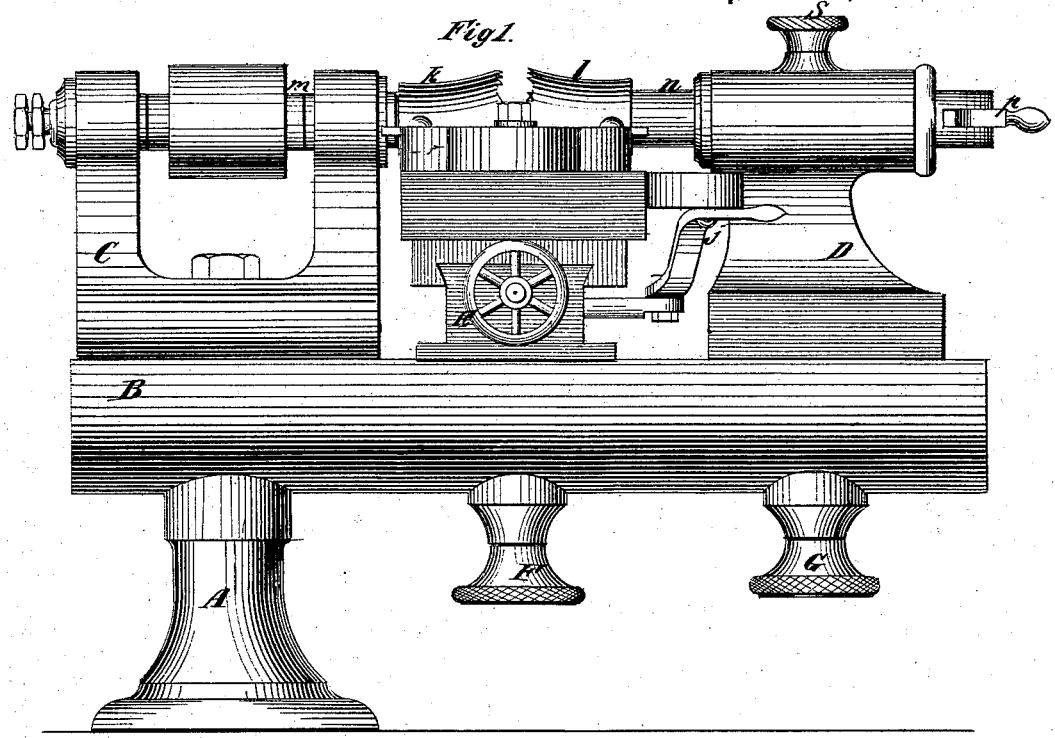
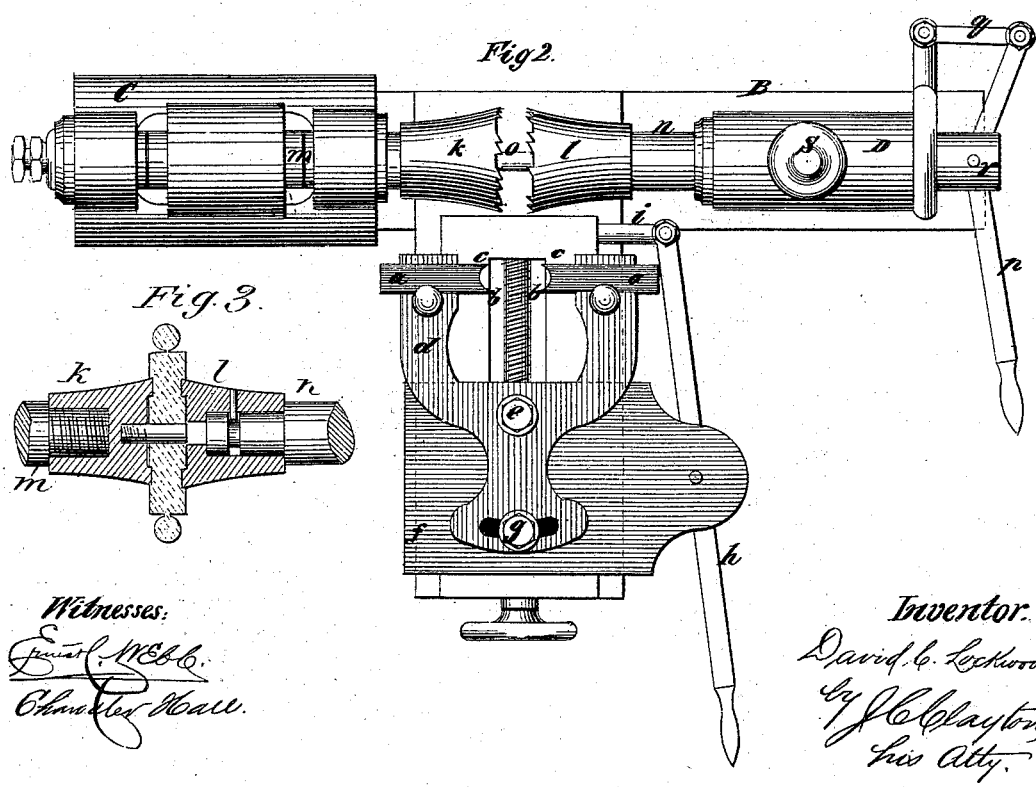
Witnesses:
Inventor.
David C. Lockwood
By J. C. Clayton
his Atty.

UNITED STATES PATENT OFFICE.

DAVID C. LOCKWOOD, OF NEWARK, NEW JERSEY.

IMPROVEMENT IN LATHES FOR TURNING WOODEN RINGS.

Specification forming part of Letters Patent No. 214,672, dated April 22, 1879; application filed December 5, 1878.

*To all whom it may concern:*

Be it known that I, DAVID C. LOCKWOOD, of Newark, in the county of Essex and State of New Jersey, have invented certain new and useful Improvements in Lathes for Turning Rings for Harness-Trimmings, &c., of which the following specification is a description.

This invention relates to various improvements in lathes for turning wooden rings for harness-trimmings and other purposes; and the invention consists, in combination with a lathe of ordinary construction, of a pair of cutters and cutter-holder of peculiar construction and operation; also, of a novel construction and operation of chucks; also, of a plain centering-point, and in various other features of improvement, all as hereinafter more fully described.

In the accompanying drawings, Figure 1 is a side elevation, and Fig. 2 a plan view, of my improved lathe. Fig. 3 is a sectional view of the chucks.

Similar letters of reference indicate corresponding parts in all the figures.

The letters A, B, C, D, E, F, and G designate the several parts of a lathe of the usual construction. $a\ a$ represent a pair of cutters, semicircular in form and beveled on their under sides, and having their outer points or cutting-edges, $b\ b$, a little longer than the inner points, $c\ c$, so that the outer edge of the ring to be turned will be completed an instant sooner than the inner edge.

The cutters $a\ a$ are secured to a cutter-holder, $d$, which is pivoted at $e$ to the tool-rest $f$, so that by loosening the nuts $e$ and $g$ the cutter-holder $d$ can be moved from right to left, and vice versa, so as to describe an arc from $e$ as a center, thereby affording great facility of adjustment of the cutters $a\ a$ when ornamental rings are to be turned.

$h$ designates a lever which is pivoted to an arm, $i$, extending laterally from the inner end of the slide-rest E. The lever $h$ is slotted longitudinally at about its middle to receive a stud, $j$, which projects downward from the center of the right-hand side of the tool-rest $f$. The arrangement of the slot and stud $j$ allows free play of the lever, and by this means the cutter-holder $d$ can be easily moved laterally on the tool-rest $f$, and the cutters $a$ $a$ can be readily adjusted to turn first one side and then the other of the rings.

$k$ and $l$ designate a pair of chucks, which, instead of having continuous rows of teeth, are provided with several groups of three or more teeth in each group, arranged at intervals around the circumference of each chuck. The advantage of this construction of chucks is, that they are less liable to split the wooden blanks than chucks of the usual construction.

The chuck $k$ is secured to and revolves with the spindle $m$, and the chuck $l$ is secured to and revolves on the spindle $n$. Thus when the machine is in operation, as hereinafter described, both chucks will revolve with the spindle $m$. A plain centering-point, $o$, projects from the center of the chuck $k$, and the chuck $l$ is recessed to receive the point $o$ when the chucks are in the locked position shown in Fig. 3.

$p$ designates a lever, which is pivoted to an elbow-like arm, $q$, projecting from the headstock D. This lever $p$ is provided with a longitudinal slot which fits a stud, $r$, passing through the slotted right-hand end of the spindle $n$, and the chuck $l$ is secured at any desired position away from the chuck $k$ by means of a thumb-screw, $s$, which can be turned to press against and hold the spindle $n$ or release it at pleasure. Thus, by means of this lever $p$, the movable chuck $l$ can be moved toward or away from the stationary chuck $k$, as hereinafter more fully described.

The operation of my improved lathe is as follows, to wit: The blank is first inserted between the chucks, and then the lever $p$ is pushed by the operator to the left until the centering-point $o$ pierces and centers the blank and the chucks take hold of it firmly. The thumb-screw $s$ is then screwed down to rigidly hold the spindle $n$ and keep the chuck $l$ in its position on the blank. The cutter-holder $d$ is then adjusted to the desired position by means of the slide-rest E, and the operator then adjusts one of the semicircular cutters $a\ a$ by moving the lever $h$, which in turn moves the cutter-holder $d$ on the tool-rest $f$ until the right or left hand cutter, as the case may be, is pressed firmly against the blank. Power is then applied to the shaft which surrounds the spindle $m$ in the usual way, and the chucks revolve, carrying the blank, which is thus rapidly turned by the cutter in operation until a true semicircle is cut into the blank, when the operator moves the lever $h$ to bring the other cutter against the blank without stopping the machine, and the operation goes on until the ring is completely formed. The thumb-screw $s$ is then unscrewed, the lever $p$ moved to the right, and the completed ring drops into the receptacle provided for it. Another blank is then inserted and the operation repeated.

My improved lathe has many advantages over those heretofore in use, among which are the following: First, by means of the peculiar construction of the cutters $a\ a$ the ring is completely formed without stopping the operation of the machine, and when delivered from the lathe it does not require any trimming or smoothing, as my improved cutters turn a perfectly smooth round ring, which has not heretofore been done; second, by means of the swiveled cutter-holder $d$, I can adjust the cutters to any desired position, so as to turn ornamental rings without necessitating the use of special cutters, as heretofore; third, by means of the lever $h$, in connection with the guide-rest and its appendices, the cutter-holder and cutters can be readily and easily moved and adjusted as desired without stopping the operation of the lathe, as heretofore; fourth, by means of the plain centering-point $o$ the blanks can be placed in position, centered, and taken off with great facility and more rapidly than could be done with the screw-threaded centering-points heretofore in use, and without stopping the operation of the lathe; fifth, by means of the stationary chuck $k$ and movable chuck $l$ the former turning with its spindle and the latter turning on its spindle, and both revolving, when locked, with the spindle $m$, I can move the spindle $n$ and chuck $l$ backward and forward by means of the lever $p$, thereby permitting the adjustment of the blanks without stopping the operation of the lathe, which could not heretofore be done; sixth, by my arrangement of groups of teeth on the circumference of the chucks instead of continuous rows of teeth the chucks are less liable to split the blanks, which is a saving of material and labor; and, finally, by my improved lathe I can turn out a completely-formed ring in less time, at less cost, with less labor, and with less waste of material than could be done by lathes or tools heretofore in use.

I claim as my invention and desire to secure by Letters Patent—

1. In a lathe for turning wooden or other rings, the combination, with the cutter-holder, tool-rest, and slide-rest, of a pair of semicircular cutters beveled on the under side and having the outer points of their cutting-edges a little longer than the inner points, so as to turn the outer circumference of the ring an instant sooner than the inner circumference, and means for operating the same, substantially as specified.

2. In a lathe for turning wooden or other rings, the combination, with a pair of semicircular cutters, of a swiveled cutter-holder, by which the cutters can be adjusted to turn ornamental rings, substantially as specified.

3. The combination, in a lathe for turning wooden or other rings, with a pair of semicircular cutters and swiveled cutter-holder, of a tool-rest and lever for adjusting the cutter-holder and cutters, so as to turn first one side and then the other of the ring, substantially as specified.

4. The combination, in a lathe for turning wooden or other rings, of a pair of chucks having groups of three or more teeth around their circumference and smooth spaces between each group, as and for the purpose specified.

5. The combination, in a lathe for turning wooden rings, of the cutters $a\ a\ b\ b\ c\ c$, cutter-holder $d$, nuts $e\ g$, tool-rest $f$, stud $j$, and lever $i\ h$, substantially as and for the purposes herein shown and described.

6. The combination, in a lathe for turning wooden rings, of the chucks $k$ and $l$, centering-point $o$, spindles $m$ and $n$, stud $r$, lever $p\ q$, and thumb-screw $s$, substantially as and for the purposes herein shown and described.

The foregoing description of my said invention in lathes signed by me this 6th day of November, A. D. 1878.

DAVID C. LOCKWOOD.

Witnesses:
ERNEST C. WEBB,
E. A. SHORTER.